US008863508B2

(12) United States Patent
Nelson et al.

(10) Patent No.: US 8,863,508 B2

(45) Date of Patent: Oct. 21, 2014

(54) HYDRAULIC CIRCUIT HAVING ENERGY STORAGE AND REUSE

(75) Inventors: Bryan E. Nelson, Lacon, IL (US); Jeremy T. Peterson, Washington, IL (US); Jeffrey L. Kuehn, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 676 days.

(21) Appl. No.: 13/171,166

(22) Filed: Jun. 28, 2011

(65) Prior Publication Data

US 2013/0000291 A1 Jan. 3, 2013

(51) Int. Cl.

| | |
|---|---|
| ***F16D 31/02*** | (2006.01) |
| ***E02F 9/22*** | (2006.01) |
| ***F15B 21/14*** | (2006.01) |
| *F01P 7/04* | (2006.01) |

(52) U.S. Cl.

CPC ..... *E02F 9/2217* (2013.01); *F15B 2211/20546* (2013.01); *F15B 2211/88* (2013.01); *F15B 2211/763* (2013.01); *F15B 2211/50518* (2013.01); *F15B 2211/7058* (2013.01); *E02F 9/226* (2013.01); *F15B 21/14* (2013.01); *F15B 2211/212* (2013.01); *F01P 7/044* (2013.01)

USPC .................................. 60/417; 60/413; 60/418

(58) Field of Classification Search

USPC ............................ 60/418, 413, 417, 414, 329

See application file for complete search history.

(56) References Cited

U.S. PATENT DOCUMENTS

| | | | |
|---|---|---|---|
| 4,240,515 A * | 12/1980 | Kirkwood | 180/165 |
| 4,347,701 A | 9/1982 | Eddens et al. | |
| 4,694,649 A * | 9/1987 | Howeth | 60/468 |
| 4,890,859 A * | 1/1990 | Drott | 280/6.157 |
| 6,151,894 A | 11/2000 | Endo et al. | |
| 6,460,332 B1 | 10/2002 | Maruta et al. | |
| 6,655,136 B2 | 12/2003 | Holt et al. | |
| 6,848,255 B2 * | 2/2005 | Chiaramonte | 60/456 |
| 7,240,486 B2 | 7/2007 | Huang et al. | |
| 7,472,546 B2 | 1/2009 | Anderson | |
| 7,497,080 B2 * | 3/2009 | Ueda | 60/421 |
| 7,712,309 B2 | 5/2010 | Vigholm | |
| 2002/0148223 A1 | 10/2002 | Reiners et al. | |
| 2008/0250781 A1 | 10/2008 | Mueller et al. | |
| 2009/0084102 A1 | 4/2009 | Mueller et al. | |

FOREIGN PATENT DOCUMENTS

| | | |
|---|---|---|
| EP | 1963687 | 9/2008 |
| WO | WO2007101467 | 9/2007 |

OTHER PUBLICATIONS http://www.boschrexroth.com/business_units/brm/en/products_and_solutions/functional_modules/index.jspd downloaded on Aug. 15, 2011.

http://www.sauer-danfoss.com/stellent/groups/public/documents/web_content/c022881.pdf#page=1 downloaded on Aug. 15, 2011.

(Continued)

*Primary Examiner* — Edward Look

*Assistant Examiner* — Daniel Collins

(74) *Attorney, Agent, or Firm* — Finnegan, Henderson, Farabow, Garrett & Dunner LLP

(57) ABSTRACT

A hydraulic circuit is disclosed. The hydraulic circuit may have a pump, a motor, a tank, and an accumulator. The hydraulic circuit may also have a valve movable between a first position at which an output of the pump is fluidly connected to the tank and the accumulator is fluidly connected to the motor, and a second position at which the output of the pump is fluidly connected to the motor.

20 Claims, 5 Drawing Sheets

(56) References Cited

OTHER PUBLICATIONS http://www.eaton.com/Eaton/ProductsServices/ProductsbyCategory/HybridPower/SystemsOverview/HydraulicHybrid/index.htm downloaded on Aug. 15, 2011.

http://en.wikipedia.org/wiki/Hydraulic__Launch__Assist downloaded on Aug. 15, 2011.

http://www.parker.com/portal/site/PARKER/menuitem.31c35c58f54e63cb97b11b10237ad1ca/?vgnextoid=c17f1bacf68f2210VgnVCM10000048021dacRCRD&vgnextchannel=7ae0724c84e22110VgnVCM1000000d0da8c0RCRD&vgnextfmt=search&IDE=c17f1bacf68f2210VgnVCM10000048021dacRCRD&language=English downloaded on Aug. 15, 2011.

http://www.boschrexroth-us.com/country__units/america/united__states/en/Company/Press/trade__show__information/a__downloads/Hydrostatic__Regenerative__Braking__Brochure.pdf downloaded on Aug. 15, 2011.

U.S. Appl. No. 12/957,094 of Bryan E. Nelson et al. entitled “Hydraulic Fan Circuit Having Energy Recovery” filed on Nov. 30, 2010.

* cited by examiner

HYDRAULIC CIRCUIT HAVING ENERGY STORAGE AND REUSE

TECHNICAL FIELD

The present disclosure relates generally to a hydraulic circuit, and more particularly, to a hydraulic circuit having energy storage and reuse.

BACKGROUND

Engine-driven machines such as, for example, dozers, loaders, excavators, motor graders, and other types of heavy equipment typically include a cooling system that cools the associated engine and other machine components below a threshold that provides for longevity of the machines. The cooling system consists of one or more air-to-air and/or liquid-to-air heat exchangers that chill coolant circulated throughout the engine and combustion air directed into the engine. Heat from the coolant or combustion air is passed to air from a fan that is speed controlled based on a temperature of the engine.

The cooling system fan is generally hydraulically powered. That is, a pump driven by the engine draws in low-pressure fluid and discharges the fluid at elevated pressures to drive a motor that is mechanically connected to the fan. When a temperature of the engine is higher than desired, the pump and motor work together to increase the speed of the fan. When the temperature of the engine is low, the pump and motor work together to decrease the speed of the fan and, in some situations, even stop the fan altogether.

Although effective at cooling the engine, it has been found that the hydraulic circuit driving the cooling fan described above and/or other hydraulic circuits of the same machine may have excess capacity at times that is not utilized or even wasted. With increasing focus on the environment, particularly on machine fuel consumption, it has become increasingly important to fully utilize all resources.

One attempt to improve hydraulic circuit efficiency is described in U.S. Pat. No. 6,460,332 that issued to Maruta et al. on Oct. 8, 2002 ("the '332 patent"). Specifically, the '332 patent discloses a hydraulic circuit that includes a pump connected to a motor in an open-loop circuit. An accumulator is disposed between the pump and motor and configured to accumulate fluid pressurized by the pump and discharge accumulated fluid to the motor.

Although the accumulator of the '992 patent may help to more fully utilize available resources, it may also be limited. That is, the system of the '992 patent does not provide a way to unload the pump during discharge of the accumulator. Without this ability, any benefit provided by the accumulator may not be fully realized. In addition, the configuration of the '992 patent may be limited from different types of circuits, for example from a cooling fan circuit.

The disclosed hydraulic circuit is directed to overcoming one or more of the problems set forth above and/or other problems of the prior art.

SUMMARY

In one aspect, the present disclosure is directed to a hydraulic circuit. The hydraulic circuit may include a pump, a motor, a tank, and an accumulator. The hydraulic circuit may also include a valve movable between a first position at which an output of the pump is fluidly connected to the tank and the accumulator is fluidly connected to the motor, and a second position at which the output of the pump is fluidly connected to the motor.

In another aspect, the present disclosure is directed to a method of storing and reusing energy from a hydraulic circuit. The method may include pressurizing fluid with a pump, directing pressurized fluid from the pump into a motor, and directing fluid from the motor to a low-pressure tank. The method may also include accumulating pressurized fluid, selectively discharging accumulated fluid to the motor, and directing pressurized fluid from the pump to the low-pressure tank during discharging of accumulated fluid.

DETAILED DESCRIPTION

Figure 1:
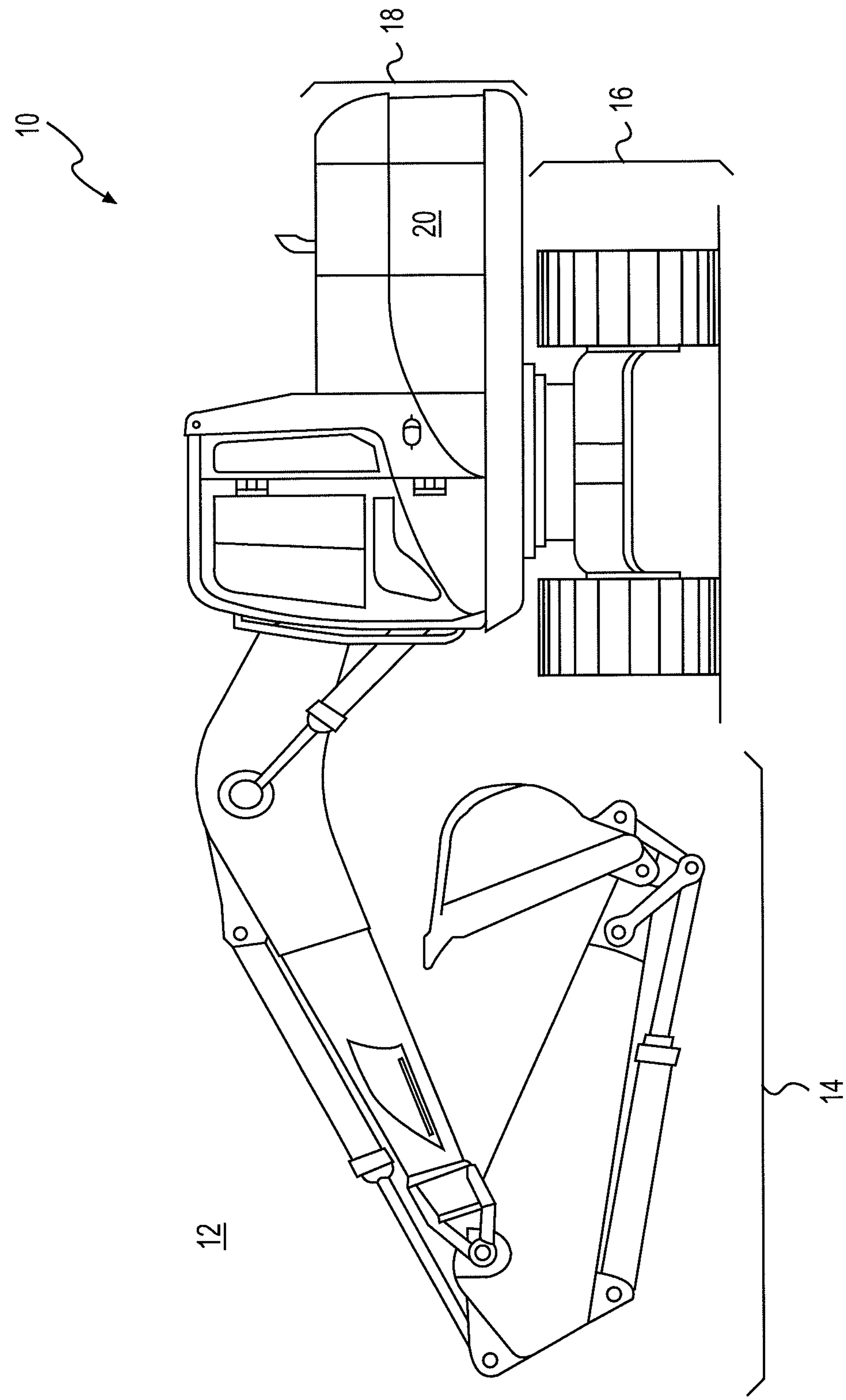
FIG. 1 is a pictorial illustration of an exemplary disclosed machine.

FIG. 1 illustrates an exemplary machine 10 performing a particular function at a worksite 12. Machine 10 may embody a stationary or mobile machine, with the particular function being associated with an industry such as mining, construction, farming, transportation, power generation, oil and gas, or another industry known in the art. For example, machine 10 may be an earth moving machine such as the excavator depicted in FIG. 1, in which the particular function includes the removal of earthen material from worksite 12 that alters the geography of worksite 12 to a desired form. Machine 10 may alternatively embody a different earth moving machine such as a motor grader or a wheel loader, or a non-earth moving machine such as a passenger vehicle, a stationary generator set, or a pumping mechanism. Machine 10 may embody any suitable operation-performing machine.

Machine 10 may be equipped with multiple systems that facilitate the operation of machine 10 at worksite 12, for example a tool system 14, a drive system 16, and an engine system 18 that provides power to tool system 14 and drive system 16. During the performance of most tasks, power from engine system 18 may be disproportionately split between tool system 14 and drive system 16. That is, machine 10 may generally be either traveling between worksites 12 and primarily supplying power to drive system 16, or parked at worksite 12 and actively moving material by primarily supplying power to tool system 14. Machine 10 will generally not be traveling at high speeds and actively moving large loads of material at the same time. Accordingly, engine system 18 may be sized to provide enough power to satisfy most power demands of either tool system 14 or of drive system 16, but not both at the same time. Although sufficient for many situations, there may be times when the total power demand from machine systems (e.g., from tool system 14 and/or drive system 16) exceeds a power supply capacity of engine system 18. Accordingly, energy from power system 18 may be stored during times of excess capacity and selectively used to temporarily increase its supply capacity at other times, as will be described in more detail below. This additional supply capacity may also or alternatively be used to reduce a fuel consumption of engine system 18 by allowing for selective reductions in the power production of engine system 18, if desired.

Figure 2:
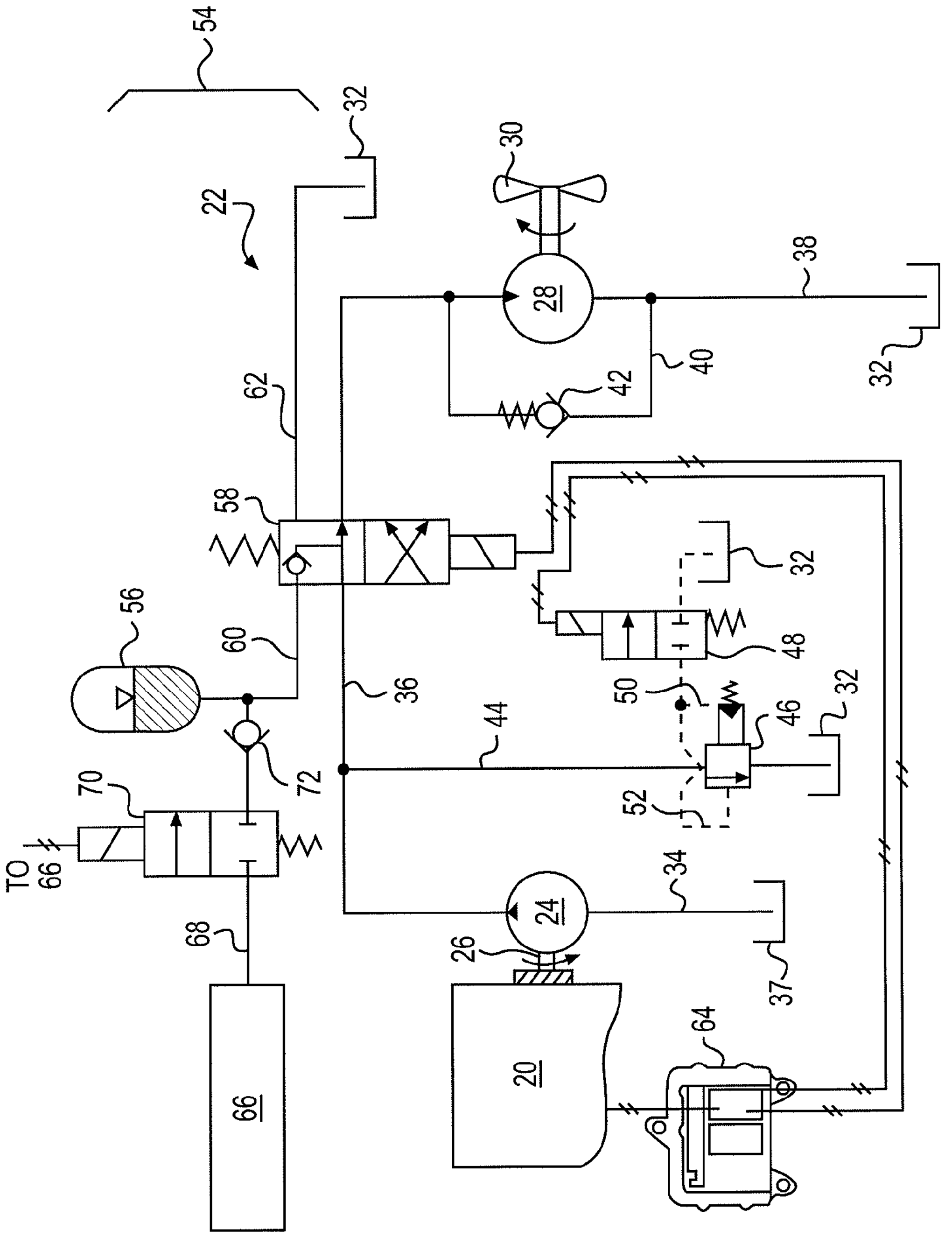
FIGS. 2-5 are schematic illustrations of exemplary disclosed hydraulic circuits that may be utilized in conjunction with the machine of FIG. 1.

As illustrated in FIG. 2, engine system 18 may include a heat engine 20, for example an internal combustion engine, equipped with a hydraulic circuit 22. Hydraulic circuit 22 may include a collection of components that are powered by engine 20 to cool engine 20. Specifically, hydraulic circuit 22 may include a pump 24 connected directly to a mechanical output 26 of engine 20, a motor 28 fluidly connected to pump 24 in an open-loop configuration, and a fan 30 mechanically connected to and driven by motor 28. Engine 20 may drive pump 24 via mechanical output 26 to draw in fluid from a low-pressure tank 32 via an inlet passage 34 and to discharge the fluid at an elevated pressure into an outlet passage 36. Motor 28 may receive and convert the pressurized fluid from pump 24 into mechanical power that drives fan 30 to generate a flow of air. The flow of air may be used to cool engine 20 directly and/or indirectly by way of a heat exchanger (not shown). Fluid exiting motor 28 may be directed back into tank 32 via a drain passage 38.

Pump 24, in the embodiment of FIG. 2, may be a fixed displacement pump driven by engine 20 to pressurize fluid. For example, pump 24 may embody a rotary or piston-driven pump having a crankshaft (not shown) connected to engine 20 via mechanical output 26 such that an output rotation of engine 20 results in a corresponding and fixed pumping motion of pump 24. Inlet, outlet, and drain passages 34, 36, 38 together may form the open-loop configuration of hydraulic circuit 22. Pump 24 may be dedicated to supplying pressurized fluid to only motor 28 via hydraulic circuit 22 or, alternatively, may also supply pressurized fluid to other hydraulic circuits associated with machine 10 (e.g., to hydraulic circuits associated with tool system 14, drive system 16, etc.), if desired. Similarly, pump 24 may be dedicated to drawing low-pressure fluid from only tank 32 via inlet passage 34 or, alternatively, may also draw low-pressure fluid from other tanks and/or circuits of machine 10, if desired.

Motor 28, in the embodiment of FIG. 2, may include a fixed displacement, rotary- or piston-type hydraulic motor movable by an imbalance of pressure acting on a driven element (not shown), for example an impeller or a piston. Fluid pressurized by primary pump 24 may be directed into motor 28 via outlet passage 36 and returned from motor 28 to tank 32 via drain passage 38. Motor 28 may have an outlet that is always in fluid communication with drain passage 38, corresponding to the open-loop configuration of hydraulic circuit 22. The direction of pressurized fluid to one side of the driven element and the draining of fluid from an opposing side of the driven element may create a pressure differential across the driven element that causes the driven element to move or rotate. The rate of fluid flow through motor 28 may determine the rotational speed of motor 28 and fan 30, while the pressure imbalance of motor 28 may determine the torque output of motor 28 to fan 30.

Fan 30 may be disposed proximate one or more liquid-to-air or air-to-air heat exchangers (not shown) and configured to produce a flow of air directed through channels of the exchanger for heat transfer with coolant or combustion air therein. Fan 30 may include a plurality of blades connected to and driven by motor 28 at a speed corresponding to a desired flow rate of air, a desired engine coolant temperature, and/or a desired load on engine 20.

Hydraulic circuit 22 may be provided with fluid makeup and relief functionality. For example, a bypass passage 40 may be associated with motor 28 and connected between outlet passage 36 and drain passage 38. A makeup valve 42, for example a check-type valve, may be disposed within bypass passage 40 and be configured to allow fluid from drain passage 38 (i.e., from low-pressure tank 32) to flow into outlet passage 36 when a pressure of outlet passage 36 is lower than a pressure of low-pressure tank 32 (e.g., during an overrunning condition). A control passage 44 may extend between outlet passage 36 and low-pressure tank 32, and a relief valve 46 may be disposed within control passage 44 to selectively relieve a pressure of outlet passage 36. That is, when a pressure of fluid within outlet passage 36 generates a force on relief valve 46 that exceeds an opposing flow-blocking bias, relief valve 46 may move towards a flow-passing position (not shown) to allow fluid from outlet passage 36 to drain to low-pressure tank 32, the draining flow rate relating to the pressure of outlet passage 36.

Relief valve 46 may also be utilized to control a speed of motor 28. Specifically, the flow-blocking bias of relief valve 46 (i.e., the bias exerted on relief valve 46 to move relief valve 46 towards a flow-blocking position) may be variable and adjusted by way of a speed control valve 48, to thereby control the flow rate of fluid passing from pump 24 to motor 28 and the resulting speed of fan 30. The flow-blocking bias of relief valve 46 may include a substantially constant spring bias that urges relief valve 46 toward the flow-blocking position, and a variable hydraulic bias that adds to the spring bias. The hydraulic bias may be generated by a first pilot flow 50 acting on an end of relief valve 46 together with the spring bias. A similar second pilot flow 52 may act on an opposing end of relief valve 46 to counter-act the first pilot flow 50. Speed control valve 48 may be a solenoid-operated valve that is movable based on a command from a controller 64 between a flow-blocking first position at which a pressure of the first pilot flow 50 is increased (shown in FIG. 2), and a flow-passing second position (not shown) at which the pressure of the first pilot flow 50 is reduced through drainage to low-pressure tank 32. Speed control valve 48 may be movable to any position between the first and second positions to thereby vary the flow-blocking bias of relief valve 46 and the subsequent speed of fan 30.

An accumulator arrangement 54 may be associated with hydraulic circuit 22 for use during energy recovery operations. Accumulator arrangement 54 may include, among other things, an accumulator 56, a selector valve 58, an accumulator passage 60 that extends between accumulator 56 and selector valve 58, and a drain passage 62 that extends between selector valve 58 and low-pressure tank 32.

Accumulator 56 may embody a pressure vessel filled with a compressible gas that is configured to store pressurized fluid for future use by motor 28. The compressible gas may include, for example, nitrogen, argon, helium, or another appropriate compressible gas. As fluid in communication with accumulator 56 exceeds a predetermined pressure, the fluid may flow into accumulator 56. Because the gas therein is compressible, it may act like a spring and compress as the fluid flows into accumulator 56. When the pressure of the fluid within accumulator passage 60 drops below the predetermined pressure of accumulator 56, the compressed gas may expand and urge the fluid from within accumulator 56 to exit. It is contemplated that accumulator 56 may alternatively embody a membrane/spring-biased or bladder type of accumulator, if desired.

Selector valve 58 may be a single-acting, spring-biased, solenoid-controlled valve that is movable between two distinct positions based on a command from controller 64. In the first position (shown in FIG. 2), fluid pressurized by pump 24 may be allowed to pass through selector valve 58 to motor 28 via outlet passage 36, and simultaneously into accumulator 56 via selector valve 58 as long as the pressure within outlet passage 36 is greater than the predetermined pressure of accumulator 56. When selector valve 58 is in the second position, pressurized fluid from within accumulator 56 may be allowed to pass through selector valve 58 and into motor 28, thereby driving motor 28 with previously-accumulated fluid. When selector valve 58 is in the second position and accumulator 56 is discharging fluid to motor 28, pump 24 may be connected to low-pressure tank 32 via selector valve 58. That is, when selector valve 58 is in the second position, pump 24 may be unloaded by selector valve 58 through connection to low-pressure tank 32, thereby lowering a torque consumption of pump 24 and associated load on engine 20. Selector valve 58 may be spring-biased toward the first position and moved to the second position when commanded to do so by controller 64.

Accumulator 56 may also be in fluid communication with another hydraulic circuit 66 that forms a portion of, for example, tool system 14, drive system 16, or another system of machine 10. In particular, an auxiliary supply passage 68 may fluidly connect hydraulic circuit 66 to accumulator 56 to fill accumulator 56 with waste or excess fluid having an elevated pressure. A control valve 70 and/or a check valve 72 may be disposed within auxiliary supply passage 68 to help regulate fluid flow into accumulator 56. A sensor (not shown), for example a pressure sensor, temperature sensor, viscosity sensor, etc., may be associated with auxiliary supply passage 68, if desired, to provide a signal to controller 64 indicative of a fluid parameter of auxiliary supply passage 68 and/or accumulator 56 for use in regulating operation of charge and/or control valves 58, 70.

Controller 64 may embody a single or multiple microprocessors, field programmable gate arrays (FPGAs), digital signal processors (DSPs), etc. that include a means for controlling an operation of hydraulic circuit 22 in response to signals received from engine 20 and/or the various sensors mentioned above. Numerous commercially available microprocessors can be configured to perform the functions of controller 64. It should be appreciated that controller 64 could readily embody a microprocessor separate from that controlling other machine-related functions, or that controller 64 could be integral with a machine microprocessor and be capable of controlling numerous machine functions and modes of operation. If separate from the general machine microprocessor, controller 64 may communicate with the general machine microprocessor via datalinks or other methods. Various other known circuits may be associated with controller 64, including power supply circuitry, signal-conditioning circuitry, actuator driver circuitry (i.e., circuitry powering solenoids, motors, or piezo actuators), and communication circuitry.

Figure 3:
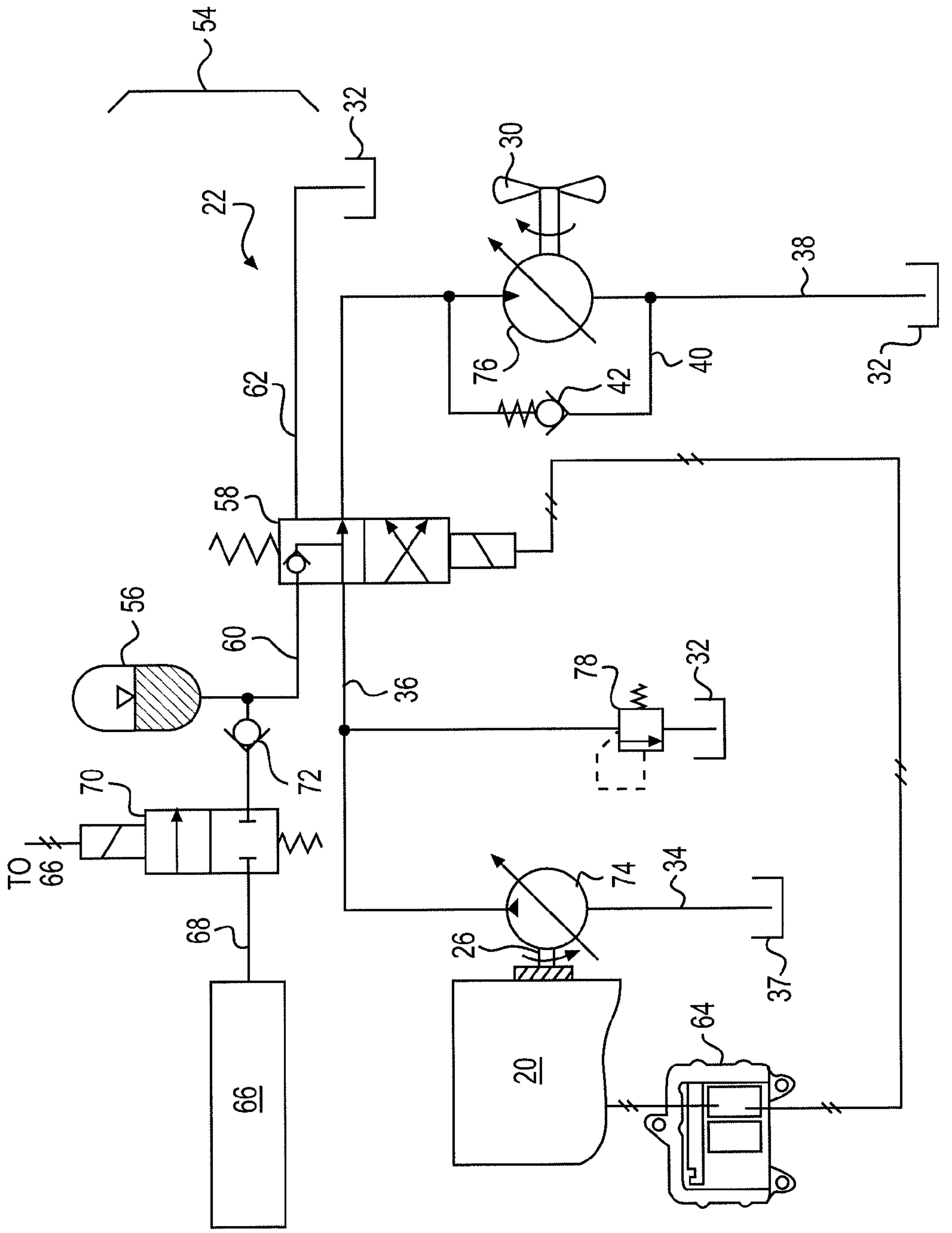

Controller 64 may be in communication with valves 48, 58, and 70 to control operations of hydraulic circuit 22 during at least two distinct modes of operation based on input from engine 20 and/or various sensors. The modes of operation may include a normal mode during which pump 24 drives motor 28 to cool engine 20 and accumulator 56 is filled with pressurized fluid (i.e., charged), and an energy recovery mode during which accumulator 56 discharges fluid to drive motor 28 and cool engine 20 while pump 24 is unloaded. During the first mode of operation, controller 64 may adjust the speed of motor 28 and fan 30 through the use of speed control valve 58. These modes of operation will be described in more detail in the following section to further illustrate the disclosed concepts FIG. 3 illustrates another embodiment of hydraulic circuit 22. In this embodiment, the fixed displacement pump 24 and/or the fixed displacement motor 28 described above may be replaced with a variable displacement pump 74 and/or motor 76. In the configuration of FIG. 3, the speed of motor 28 may be selectively adjusted by way of displacement control, rather than fluid relief from outlet passage 36 to low-pressure tank 32. Accordingly, speed control valve 48 may be omitted in the embodiment of FIG. 3, and the variable relief valve 46 may be replaced with a fixed setting relief valve 78.

Figure 4:
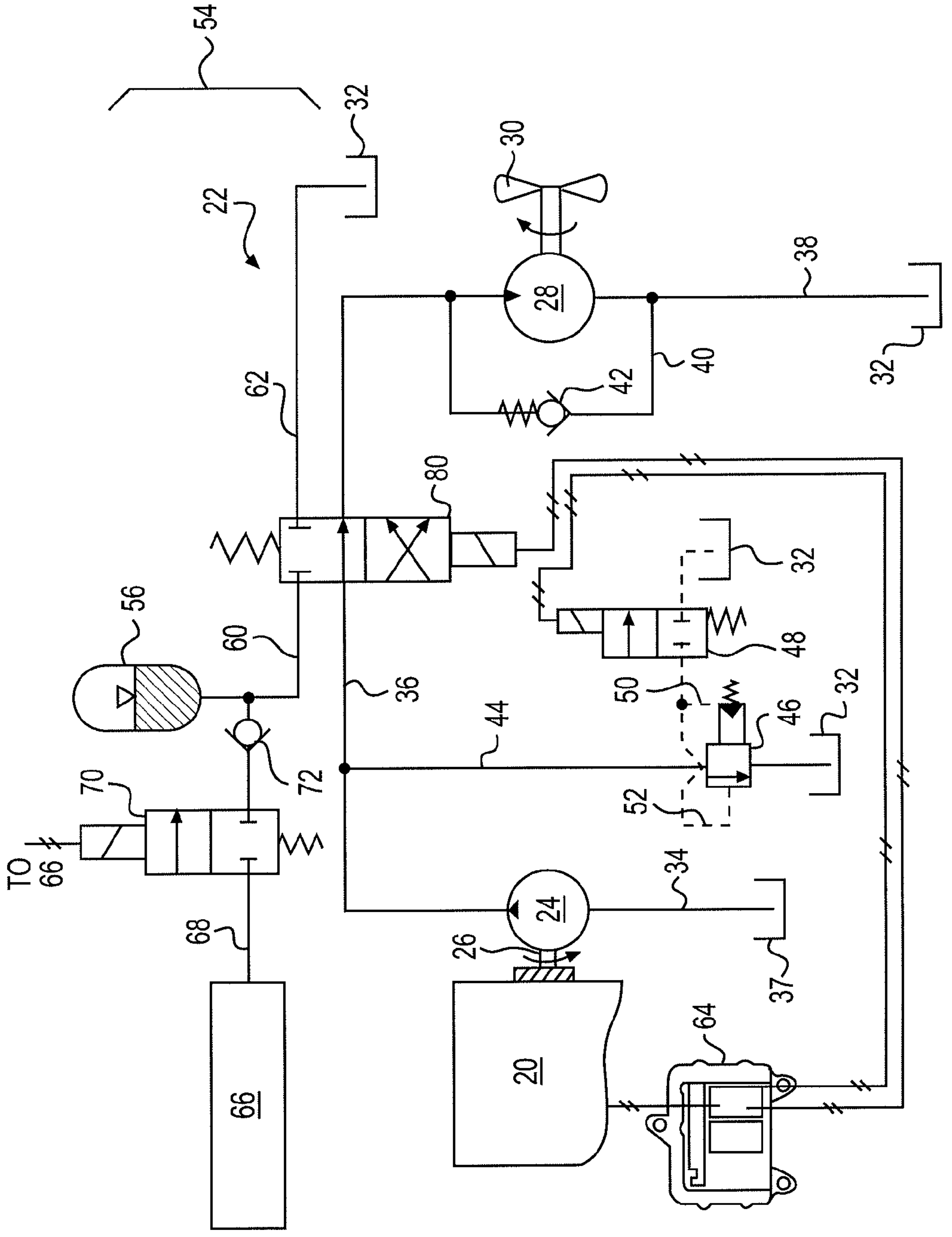

FIG. 4 illustrates yet another embodiment of hydraulic circuit 22. In this embodiment, selector valve 58 may be replaced with a different selector valve 80. Selector valve 80 may be configured to allow fluid from only hydraulic circuit 66 to charge accumulator 56. That is, when selector valve 80 is in the first position (shown in FIG. 4), fluid may pass from pump 24 to only motor 28 and fluid from pump 24 may be inhibited from directly entering accumulator 56 (that is, fluid from pump 24 and/or another pump may first be required to pass through hydraulic circuit 66 before being allowed to enter accumulator 56). In addition, regardless of the position of selector valve 80, fluid from hydraulic circuit 66 may be allowed to pass into hydraulic circuit 22 (either into accumulator 56 and/or directly to motor 28 via selector valve 80), as long as the pressure of fluid within hydraulic circuit 66 is greater than the predetermined pressure of accumulator 56 or greater than the pressure of fluid within outlet passage 36.

Figure 5:
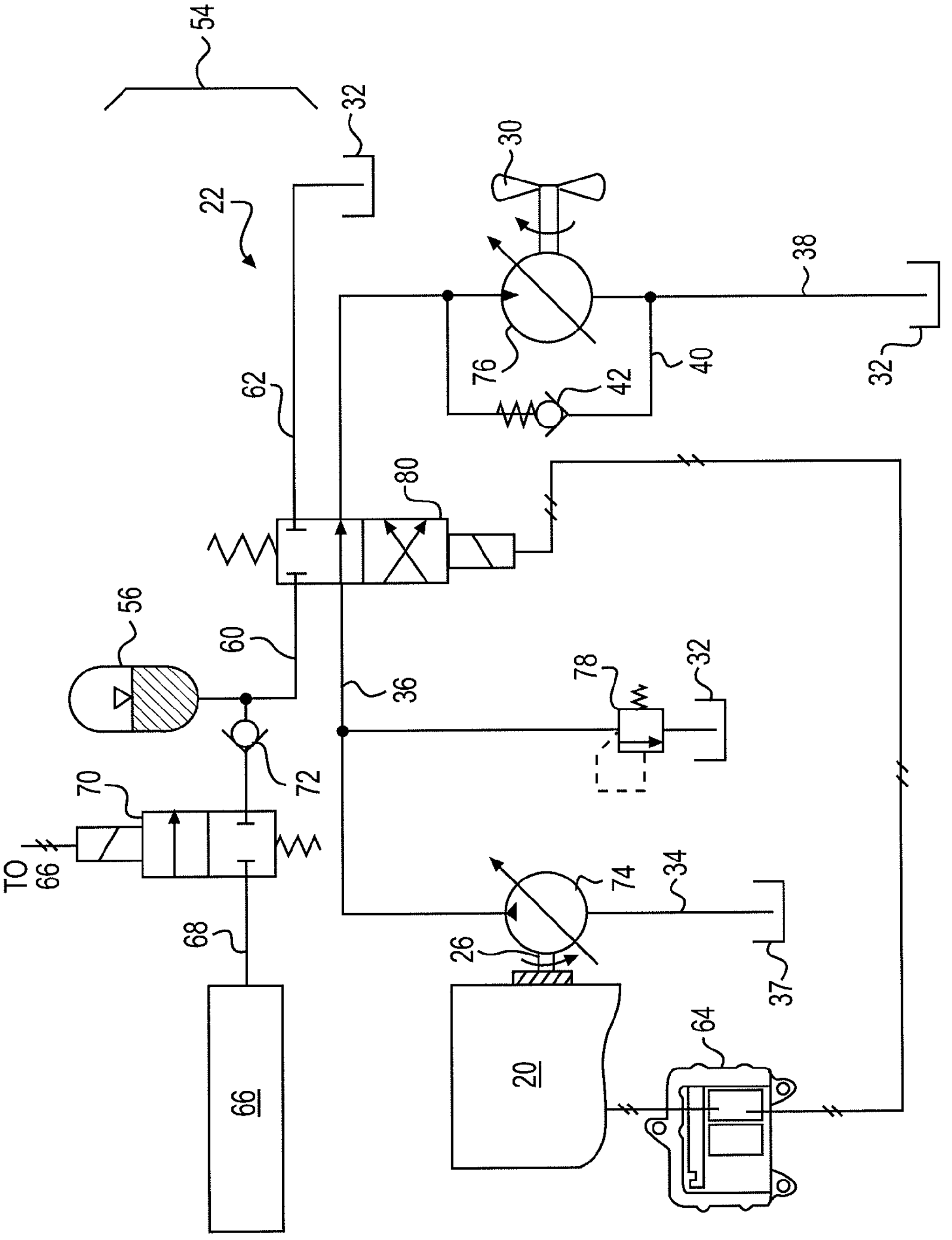

FIG. 5 illustrates an embodiment of hydraulic circuit 22 that combines features of the embodiments of FIGS. 3 and 4. In particular, hydraulic circuit 22 of FIG. 5 includes the variable displacement pump 74 and/or motor 76, as well as selector valve 80 that inhibits direct accumulator charging by pump 24.

INDUSTRIAL APPLICABILITY

The disclosed hydraulic circuit may be applicable to any engine system where cooling and energy recovery is desired. The disclosed hydraulic circuit may provide for energy recovery from any machine circuit through the selective use of accumulator charging and discharging. In addition, the disclosed hydraulic circuit may provide a low-cost, simple way to reduce engine loads and/or increase system capacity, thereby increasing machine efficiency and/or performance. Operation of hydraulic circuit 22 will now be described.

During the normal mode of operation, engine 20 may drive pump 24 to rotate and pressurize fluid drawn from low-pressure tank 32. The pressurized fluid may be discharged from pump 24 into outlet passage 36 and directed into motor 28. As the pressurized fluid passes through motor 28, hydraulic power in the fluid may be converted to mechanical power used to rotate fan 30. As fan 30 rotates, a flow of air may be generated that facilitates cooling of engine 20. Fluid exiting motor 28, having been reduced in pressure, may be allowed to flow back into low-pressure tank 36 via drain passage 38 to end the cycle in an open-loop fashion.

The fluid flow into motor 28 and the corresponding speed of motor 28 during the normal mode of operation may be regulated based on signals from various sensors, for example based on an engine speed signal, an engine temperature signal, a motor speed signal, and/or another similar signal. Controller 64 may receive these signals and reference a corresponding engine speed, engine temperature, motor speed, or other similar parameter with one or more lookup maps stored in memory to determine a desired rotation speed of fan 30. Controller 64 may then generate appropriate commands to be sent to speed control valve 48 of FIGS. 2 and 4 and/or to the variable displacement pump 74 and/or motor 76 of FIGS. 3 and 5 to affect corresponding adjustments to motor speeds. When sufficient cooling of engine 20 has been obtained (i.e., when the demand for cooling air flow has been reduced), controller 64 may cause fan 30 to slow or even stop through the use of speed control valve 48 and/or appropriate displacement adjustments.

Accumulator 56 may be charged during the normal mode of operation in a least two different ways. For example, when pump 24 is driven to pressurize fluid, any excess fluid not consumed by motor 28 may fill accumulator 56 via selector valve 58, when selector valve 58 is in the first position and the pressure of the fluid within outlet passage 36 exceeds the predetermined pressure of accumulator 56. The movement of selector valve 58 to the first position may be closely regulated by controller 64, based at least in part on load signals from engine 20, such that accumulator 56 may be charged at appropriate times (i.e., at times when engine 20 and/or pump 24 has excess capacity). Alternatively or additionally, accumulator 56 may be charged by hydraulic circuit 66. That is, at any time during normal operation, when a pressure of fluid within hydraulic circuit 66 is greater than a pressure within accumulator 56, fluid may be passed from circuit 66, through auxiliary supply passage 68 and control valve 70, and past check valve 72 into accumulator 56.

When engine 20 becomes overloaded, pump 24 has insufficient capacity to adequately drive motor 28, and/or accumulator 56 is filled with pressurized fluid and increased efficiency is desired, controller 64 may regulate selector valve 58 (i.e., cause selector valve to move to the second position) to allow accumulator 56 to discharge previously-accumulated fluid to motor 28. By driving primary motor 28 with previously-accumulated fluid (as opposed to fluid from pump 24), engine 20 may be assisted to increase a power supply capacity and/or to decrease a fuel consumption of engine 20.

The disclosed hydraulic circuit may be relatively inexpensive and provide multiple levels of energy recovery. In particular, because the hydraulic circuit may utilize few components to recover otherwise wasted energy and can be applied to simple open-loop configurations, the cost of the circuit may remain low enough for use in low-cost machine configurations. Further, because accumulator 56 may be able to fill with fluid from different sources, an amount of energy recovery may be increased.

It will be apparent to those skilled in the art that various modifications and variations can be made to the disclosed hydraulic circuit. Other embodiments will be apparent to those skilled in the art from consideration of the specification and practice of the disclosed hydraulic circuit. It is intended that the specification and examples be considered as exemplary only, with a true scope being indicated by the following claims and their equivalents.

What is claimed is:

1. A hydraulic circuit, comprising:
- a pump;
- a motor;
- a tank;
- an accumulator;
- a selector valve selectively operable to allow fluid from another circuit to enter the accumulator; and
- a valve movable between a first position at which an output of the pump is fluidly connected to the tank and the accumulator is fluidly connected to the motor, and a second position at which the output of the pump is fluidly connected to the motor and the pump is blocked from the accumulator.

2. The hydraulic circuit of claim 1, wherein the valve includes a check element disposed between the pump and the accumulator when the valve is in the second position.

3. The hydraulic circuit of claim 1, wherein the valve is a solenoid-operated, 2-position valve that is spring-biased toward the second position.

4. The hydraulic circuit of claim 1, wherein the motor includes an outlet that is always fluidly connected to the tank.

5. The hydraulic circuit of claim 1, further including a fan mechanically driven by the motor.

6. The hydraulic circuit of claim 1, wherein:
- the pump and motor both have fixed displacement; and
- the hydraulic circuit further includes a speed control valve configured to selectively relieve at least a portion of an output of the pump to the tank to control a speed of the motor.

7. The hydraulic circuit of claim 1, wherein at least one of the pump and motor has variable displacement.

8. The hydraulic circuit of claim 1, further including a controller in communication with the valve and configured to selectively cause the valve to move to the first position based on a loading condition of an engine driving the pump.

9. The hydraulic circuit of claim 1, wherein fluid pressurized by the pump is inhibited from directly entering the accumulator.

10. A hydraulic circuit, comprising:
- a pump driven by an engine to pressurize fluid;
- a motor;
- a fan mechanically driven by the motor;
- a tank;
- an open circuit fluidly connecting the pump to the motor and the motor to the tank;
- an accumulator in selective fluid communication with the open circuit;
- a selector valve selectively operable to allow fluid from another circuit to enter the accumulator;
- a valve movable from a first position at which an output of the pump is fluidly connected to the tank and the accumulator is fluidly connected to the motor, to a second position at which the output of the pump is fluidly connected to the motor and the pump is blocked from the accumulator; and
- a controller in communication with the valve and configured to selectively cause the valve to move to the first position based on a loading condition of the engine.

11. A method of storing and reusing energy from a hydraulic circuit, comprising:
- pressurizing fluid with a pump;
- directing pressurized fluid from the pump into a motor;
- directing fluid from the motor to a low-pressure tank;
- accumulating pressurized fluid; and
- monitoring a loading condition of an engine that drives the pump and based on the loading condition:
  - selectively discharging accumulated fluid to the motor; and
  - directing pressurized fluid from the pump to the low-pressure tank during discharging of accumulated fluid.

12. The method of claim 11, wherein accumulating pressurized fluid includes accumulating fluid pressurized by the pump occurs simultaneous with directing pressurized fluid from the pump into the motor.

13. The method of claim 12, wherein accumulating fluid pressurized by the pump includes accumulating fluid pressurized by the pump when the fluid has at least a threshold pressure.

14. The method of claim 12, wherein directing fluid from the motor to the low-pressure tank includes always directing fluid from the motor to the low-pressure tank.

15. The method of claim 11, wherein accumulating pressurized fluid includes selectively accumulating fluid from a source other than the pump.

16. The method of claim 15, further including blocking accumulation of pressurized fluid from the pump.

17. The method of claim 11, wherein directing pressurized fluid from the pump into the motor and directing fluid from the motor to the low-pressure tank mechanically drives a fan.

18. The method of claim 11, further including selectively relieving at least a portion of the pressurized fluid from the pump to the low-pressure tank to control a speed of the motor.

19. The method of claim 11, further including adjusting a displacement of at least one of the pump and the motor to control a speed of the motor.

20. The method of claim 11, further including inhibiting fluid pressurized by the pump from entering the accumulator.

* * * * *